United States Patent
Wynn et al.

[15] 3,671,594
[45] June 20, 1972

[54] PREPARATION OF 2,3-DIBROMO-2-BUTENE-1,4-DIOL

[72] Inventors: Robert W. Wynn; Max E. Chiddix, both of Easton, Pa.

[73] Assignee: General Anilin & Film Corporation, New York, N.Y.

[22] Filed: Aug. 9, 1967

[21] Appl. No.: 659,318

[52] U.S. Cl.................................260/633, 260/75, 260/999
[51] Int. Cl..........................................C07c 33/10
[58] Field of Search..................................260/633

[56] References Cited

UNITED STATES PATENTS 1,932,590  10/1933  Kaselitz..........................260/660 UX
3,284,515  11/1966  Dickerson et al......................260/633

OTHER PUBLICATIONS

Groggins, Unit Processes in Organic Synthesis, 4th Ed. McGraw-Hill, New York, 1952 p. 230
Hickinbottom, Reactions of Organic Compounds, Longmans Green Co., New York, 1957, p. 32
Valette, Ann. Chim. [ 12] 3 pages 644– 649, 663–666 (1948)
Lespieau, Ann. Chim. [ 8] 27 pages 171– 172 (1912)

Primary Examiner—Howard I. Mars
Attorney—Walter C. Kehm and Samson B. Leavitt

[57] ABSTRACT

Process for the preparation of 2,3-dibromo-2-butene-1,4-diol which comprises reacting bromine with 2-butyne-1,4-diol in an aqueous medium at a temperature of about −10° to 100° C. and recovering the product produced.

7 Claims, No Drawings

PREPARATION OF 2,3-DIBROMO-2-BUTENE-1,4-DIOL

BACKGROUND OF THE INVENTION

1. Field of the Invention

This invention relates to a process for the preparation of 2,3-dibromo-2-butene-1,4-diol by the direct bromination of 2-butyne-1,4-diol in an aqueous medium.

2. Description of the Prior Art

The compound, 2,3-dibromo-2-butene-1,4-diol, is a useful compound as it is known to have marked herbicidal, fungicidal and pesticidal properties and is also useful as an intermediate for the preparation of derivatives having similar activities. It is also useful as a chemical intermediate for the preparation of biocides, dyes and pharmeceuticals and for fire proofing plastics. The synthesis of these latter materials is simple, economical and does not require the presence of solvents in producing products for these various uses. Moreover 2,3-dibromo-2-butene-1,4-diol can be converted to valuable fire-resistant polyester resins by reaction thereof with dibasic acids, such as adipic acid, isophthalic acid, phthalic acid and chlorendic acid, or with the acid chlorides corresponding to such acids. It can also be used to prepare valuable fire-resistant polyurethane foams, plastics and elastomers by reaction with diisocyanates or with a mixture of other polyols and diisocyanates. Accordingly the compound, the preparation of which is the subject matter of this invention, is known to be beneficial in a number of areas.

Although 2,3-dibromo-2-butene-1,4-diol has been found to be useful in a number of areas, its difficulties in preparation have prevented any wide use in the areas mentioned because of the expense of manufacture and the practical difficulties of production which accordingly have detracted from its use in the several areas mentioned.

A number of attempts have been made heretofore to prepare this material but none have been successful so as to be commercially attractive. Thus, attempts have been made to prepare 2,3-dibromo-2-butene-1,4-diol by bromination of 2-butyne-1,4-diol in various solvent materials such as chloroform and acetic acid, by the use of various brominating agents such as hypobromous acid and with the use of expensive catalysts to effect the bromination. However none of these prior processes have been satisfactory, primarily because of the expensive materials necessary to effect the reaction and because of the poor yields obtained and/or the difficulty of isolation of the pure products. Accordingly a distinct need remains in the art for an elementary and attractive commercial process for the preparation of 2,3-dibromo-2-butene-1,4-diol.

SUMMARY OF THE INVENTION

It is accordingly one object of the present invention to provide a novel process for the manufacture of 2,3-dibromo-2-butene-1,4-diol by the direct bromination of the corresponding 2-butyne-1,4-diol which overcomes or otherwise mitigates the problems inherent in prior art processes.

A further object of the present invention is to provide a novel process for the direct bromination of 2-butyne-1,4-diol wherein the reaction is carried out under moderate-reaction conditions with the attainment of excellent yields and a high purity product.

A still further object of the present invention is to provide a process for the direct bromination of 2-butyne-1,4-diol to produce excellent yields of 2,3-dibromo-2-butene-1,4-diol wherein the reaction is carried out in an aqueous medium under moderate reaction conditions without any requirement for catalysts or other expensive reaction materials.

Other objects and advantages of the present invention will become apparent as the description thereof proceeds.

In satisfaction of the foregoing objects and advantages, there is provided by this invention a process for the preparation of 2,3-dibromo-2-butene-1,4-diol which comprises reacting 2-butyne-1,4-diol with bromine in an aqueous medium at a temperature of about −10° C. to about 100° C. and recovering the product produced.

DESCRIPTION OF THE PREFERRED EMBODIMENT

According to the present invention, it has been found that 2-butyne-1,4-diol may be smoothly brominated directly to form the corresponding 2,3-dibromo-2-butene product by direct bromination of the starting diol with elemental bromine under moderate reaction conditions wherein the reaction is carried out in an aqueous medium. It has been found that this process gives rise to a smooth reaction with excellent yields and permits convenient isolation of the desired product in a high state of purity.

The reaction which forms the basis of the present invention may be characterized by the following equation.

I. $HOCH_2C \equiv CCH_2OH + Br_2 \longrightarrow \underset{\underset{Br}{|}\phantom{=}\underset{Br}{|}}{HOCH_2C=CCH_2OH}$ As is to be appreciated from the above equation, the reaction is based on the realization that bromine may be added directly to the triple bond of the 2-butyne-1,4-diol starting material under the reaction conditions of the process of this invention without the excessive formation of mono-, tri- and tetra-brominated side products and thus provides an inexpensive and commercially useful process for the production of the highly desirable 2,3-dibromo-2-butene-1,4-diol. The starting material, 2-butyne-1,4-diol is well known in the prior art and is easily obtained inter alia by the reaction of aqueous formaldehyde and acetylene at about 100° C. and 6 atmospheres in the presence of a catalyst such as cuprous carbide. The 2-butyne-1,4-diol starting material may be employed in its aqueous solution as obtained by its method of preparation or the solid product may be used by merely dissolving in the required amount of water. This butyne-1,4-diol as normally prepared is thus suitable for use in the reaction. Any other method of preparation may of course also be employed. Accordingly, this starting material is well suited for use in the process of this invention as no isolation of the solid material need be carried out.

The process of this invention is conducted by directly brominating the 2-butyne-1,4-diol with bromine preferably elemental bromine by the addition of the bromine to an aqueous solution containing the 2-butyne-1,4-diol. While the aqueous solution of the diol starting material may be of any desired concentration, it is preferred that the 2-butyne-1,4-diol be contained in water at a concentration of about 20 to about 45 percent as the use of this concentration is advantageous in the ultimate recovery of the desired product. However, it is to be appreciated that the reaction of this invention can be carried out in concentrations higher than 45 percent but it has been found that such higher concentrations often leads to an accumulation of product which is difficult to work with in that adequate mixing to carry the reaction to completion is necessary for smooth conversion to the desired product. Accordingly, the concentration of 20 to 45 percent 2-butyne-1,4-diol in water represents a preferred aspect of the present invention.

The starting materials are used in the reaction in approximately equimolar ratios for best conversions. A preferred ratio to be employed in the process of this invention is about 0.9 to 1.1 moles of bromine per mole of 2-butyne-1,4-diol as it has been found that the reaction proceeds particularly smoothly at these ratios with a good recovery of the desired product.

The reaction is preferably carried out at a temperature range of about −10° C. to +100° C. with a preferred operating temperature of +5° C. to +25° C. as these temperature ranges are conductive in the predominant formation of the desired 2,3-dibromo product.

The reaction is carried out in the absence of any expensive catalysts, acids, etc. as it has been found that neither of these materials, nor other extraneous products, are necessary to carry out that process of this invention. Also, the reaction is carried out at atmospheric pressure as it has been found that pressure is not an essential characteristic of the process. In practicing the process of the present invention, the aqueous solution 2-butyne-1,4-diol is preferably placed in an agitated reactor maintained at a desired temperature range and the elemental bromine preferably added to the agitated solution over a period of time while the exothermic characteristics of the reaction are controlled by use of an external coolant. The bromine is preferably added to the stirred solution in a dropwise manner, thus aiding in ease of control of the reaction. The time for carrying out the addition will of course be dependent on the size of the run.

As the reaction proceeds, the product forms gradually and precipitates from solution. On completion of the reaction, it will be found that the solution has become quite viscous. After completion of the bromine addition, the mixture should be stirred for a short period of time such as ¼ to 1 hour to insure that the reaction has gone to completion. Thereafter, the product may be separated by filtration and washed free of excess bromine by the use of cold water. The product may be recrystallized as desired by conventional methods to recover products of high purity by use of organic solvents such as ethylene dichloride and the like.

It has been found that the process of the present invention results in the recovery of yields of desired product in excess of 80 percent and as high as 85 to 90 percent. Thus it is to be appreciated that the process of the present invention provides an economical and commercially attractive process for the production of the valuable material, 2,3-dibromo-2-butene-1,4-diol.

The following examples are presented to illustrate the invention with respect to certain preferred embodiments thereof but are not to be considered as limitative thereon.

EXAMPLE I 285.0 Grams of 30 percent aqueous 2-butyne-1,4-diol (containing 86 grams solid 2-butyne-1,4-diol, 1 mole) was charged to a stirred reaction flask and cooled to +5° C. by use of external coolant. Thereafter, while maintaining the temperature at +5° C. to +10° C., there was added dropwise 176.0 grams (1.1 mole) of bromine over a period of 5 hours. In conducting the addition, it was noted that after the addition of a few cc's the solution became much lighter in color and the product began to precipitate from solution. After completion of the addition, the solution was stirred 15 minutes and thereafter separated by filtration and washed with three 25cc. portions of ice water. The wet product was very light in color but after drying for about two days in a vaccum desiccator at room temperature, it became slightly darker in color. The product weighed 207 grams representing a yield of 84 percent of theory.

To effect purification, a 100 gram portion of this recovered product was dissolved in a solution of 32 grams of sodium hydroxide contained in 400 ml. of distilled water and filtered. After filtration, the solution was acidified with hydrochloric acid causing the product to precipitate. A total of 74.5 grams of pure product was recovered after washing and drying. This product has the following analysis:

Calculated for $C_4H_6O_2Br_2$: C, 19.50; H, 2.44; Br, 65.10.
Found: C, 19.97; H, 2.56; Br, 64.73.

EXAMPLE II

A total of 860 grams (10 moles) of solid 2-butyne-1,5-diol was dissolved in 3,000 cc. of distilled water. Then, with agitation, the solution was cooled to +5° C. and 1,609 grams 10+ moles of bromine) was added dropwise over a 12 hour period while maintaining the temperature at +5° to +10° C. with the aid of an external coolant. After completion of the reaction, the mixture was stirred for 15 minutes, the product filtered off and sucked as dry as possible. It was then placed in a vacuum desiccator over calcium chloride for a period of 5 days. During this time, the material changed from white to dark brown. On opening the desiccator, the product was observed to evolve fumes of HBr. Total yield of product was 2,205.5 grams representing a yield of 89 percent of theory.

This material was recrystallized batchwise as follows: one thousand mililiter of ethylene dichloride was heated to 80° C. and 100 grams of the above product dissolved therein. A small portion of sodium bicarbonate and about 1.0 grams of norite (purified charcoal) were added and the solution reflexed 5 minutes. It was then filtered hot, the filtrate cooled in ice water and the precipitate collected. To this filtrate was then added enough ethylene dichloride to bring the volume to 1000 ml. and the purification repeated with the mixture. In this manner, there was obtained 1776 grams of off-white stable product. This represented a 72 percent theoretical yield of highly purified product.

EXAMPLE III

A total of 254 grams of a 34 percent aqueous solution of 2-butyne-1,4-diol (containing 1 mole of 2-butyne-1,4-diol) was charged to a reaction flask with agitation and cooled to +5° C. Thereafter, while maintaining the temperature at +5° to +10° C., 168 grams (1.05 moles) of bromine was added dropwise over a 6-hour period. Toward the end of the addition, it was necessary to add 50 cc. of water in order to maintain agitation of the mixture in which the solid has precipitated. After completion of the reaction, the product was collected by filtration and sucked as dry as possible. The wet cake was then washed twice with 50 cc. of cold (+5° to 10° C.) of a 5 percent sodium bicarbonate solution and then with 50 cc. of cold (+5° to +10° C.) of water. The product was dried at room temperature in a vacuum desiccator. Total yield was 205 grams representing a theoretical yield of 83 percent. The product had a melting point of 110° to 113° C.

EXAMPLE IV

The procedure of Example III was repeated using 293 grams of 34 percent aqueous 2-butyne-1,4-diol (containing 1.16 moles) instead of 254 grams of the aqueous solution.

The yield of dry product was 207 grams representing 80 percent of the theoretical yield of 258 grams.

While the present invention has been described with particular reference to certain preferred embodiments thereof, it is to be understood that the invention is to be considered as limited only by the appended claims.

What is claimed is:

1. In a process for the preparation of 2,3-dibromo-2-butene-1,4-diol by the reaction of 2-butyne-1,4-diol with bromine, the improvement which comprises:
    a. reacting the 2-butyne-1,4-diol and bromine in an aqueous medium in approximately equimolar ratios;
    b. in a concentration of 2-butyne-1,4-diol in the aqueous medium of about 20 to 45 percent and
    c. at a temperature of about −10° to 100° C., wherein the solid product precipitates from solution as it is formed.

2. A process according to claim 1 wherein the bromine is present in an amount of about 0.9 to 1.1 moles per mole of 2-butyne-1,4-diol.

3. A process according to claim 1 wherein temperature is maintained over a range of about 5° to 25° C.

4. A process according to claim 1 wherein the bromine is added slowly to the aqueous solution containing the 2-butyne-1,4-diol.

5. A process according to claim 1 wherein the temperature is maintained by use of external coolant.

6. A process according to claim 1 wherein the 2-butyne-1,4-diol in the aqueous solution is obtained by dissolving solid 2-butyne-1,4-diol 4-diol in water.

7. A process according to claim 1 wherein the 2,3-dibromo-2-butene-1,4-diol product is recovered by filtering the solid from the resulting mixture.

* * * * *